(12) United States Patent
Wang et al.

(10) Patent No.: US 11,527,793 B2
(45) Date of Patent: Dec. 13, 2022

(54) AIR-COOLED ENERGY STORAGE MODULE

(71) Applicant: LISHEN POWER BATTERY SYSTEMS CO., LTD., Tianjin (CN)

(72) Inventors: Wenwen Wang, Tianjin (CN); Feng You, Tianjin (CN); Dongxing Zhao, Tianjin (CN)

(73) Assignee: LISHEN (QINGDAO) NEW ENERGY CO., LTD., Qingdao (CN)

( * ) Notice: Subject to any disclaimer, the term of this patent is extended or adjusted under 35 U.S.C. 154(b) by 0 days.

(21) Appl. No.: 17/033,913

(22) Filed: Sep. 27, 2020

(65) Prior Publication Data

US 2021/0408624 A1     Dec. 30, 2021

(30) Foreign Application Priority Data

Jun. 30, 2020 (CN) .......................... 202010610558.7
Jun. 30, 2020 (CN) .......................... 202021237247.2

(51) Int. Cl.
| | | |
|---|---|---|
| *H01M 10/6563* | (2014.01) | |
| *H01M 10/6566* | (2014.01) | |
| *H01M 10/6557* | (2014.01) | |
| *H01M 10/613* | (2014.01) | |
| *H01M 10/647* | (2014.01) | |
| *H01M 50/209* | (2021.01) | |

(52) U.S. Cl.
CPC ..... *H01M 10/6563* (2015.04); *H01M 10/613* (2015.04); *H01M 10/6557* (2015.04); *H01M 10/6566* (2015.04); *H01M 10/647* (2015.04); *H01M 50/209* (2021.01); *Y02E 60/10* (2013.01)

(58) Field of Classification Search
CPC .......... H01M 10/6563; H01M 10/613; H01M 10/6557; H01M 10/6566; H01M 10/647; H01M 50/209; Y02E 60/10
See application file for complete search history.

(56) References Cited

U.S. PATENT DOCUMENTS

2009/0120620 A1 * 5/2009 Abe ................... H01M 10/625
165/104.31

* cited by examiner

*Primary Examiner* — Lingwen R Zeng
(74) *Attorney, Agent, or Firm* — Matthias Scholl P.C.; Matthias Scholl

(57) ABSTRACT

An air-cooled energy storage module including a box body, a plurality of support beams, a baffle plate, a plurality of battery modules, an axial fan, and an end cover. The box body is a hollow structure including a first side plate, a second side plate, a bottom plate, and an opening formed by the first side plate, the second side plate, and the bottom plate. The axial fan is disposed on the first side plate. The plurality of support beams is disposed apart on the bottom plate longitudinally; a longitudinal direction refers to a direction along a connection line of the first side plate and the second side plate. The baffle plate is disposed on the plurality of support beams; and a space is disposed between the baffle plate and the bottom plate of the box body for air circulation.

7 Claims, 2 Drawing Sheets

AIR-COOLED ENERGY STORAGE MODULE

CROSS-REFERENCE TO RELATED APPLICATIONS

Pursuant to 35 U.S.C. § 119 and the Paris Convention Treaty, this application claims foreign priority to Chinese Patent Application No. 202010610558.7 filed on Jun. 30, 2020, and to Chinese Patent Application No. 202021237247.2 filed on Jun. 30, 2020. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to an air-cooled energy storage module.

Energy storage modules are a core device of energy storage power station. Disadvantages such as uneven heat dissipation and disconnected heat conduction path are associated with conventional battery modules, thus adversely affecting the performance and cycle life of the energy storage modules.

SUMMARY

The disclosure provides an air-cooled energy storage module comprising a box body, a plurality of support beams; a baffle plate; a plurality of battery modules; an axial fan; and an end cover. The box body is a hollow structure comprising a first side plate, a second side plate, a bottom plate, and an opening formed by the first side plate, the second side plate, and the bottom plate. The axial fan is disposed on the first side plate. The plurality of support beams is disposed apart on the bottom plate longitudinally; a longitudinal direction refers to a direction along a connection line of the first side plate and the second side plate; the baffle plate is disposed on the plurality of support beams; a first space is disposed between the baffle plate and the bottom plate of the box body for air circulation; the plurality of battery modules is equidistantly disposed on the baffle plate longitudinally; the baffle plate comprises a plurality of through-aperutres, and each through-aperture is disposed between every two adjacent battery modules; the second side plate comprises a plurality of transversely distributed air inlets; and the end cover is disposed on the plurality of battery modules.

In a class of this embodiment, two gaps are disposed between two sides of the plurality of battery modules and the first side plate and the second side plate, respectively.

In a class of this embodiment, a first wind screen is disposed on a first end of the baffle plate and attached to the second side plate; a second space is disposed between the second side plate and the first wind screen for air circulation; and the second space communicates with the first space; the first wind screen comprises a transverse groove facing the plurality of transversely distributed air inlets.

In a class of this embodiment, the transverse groove is aligned with a transverse central line of the plurality of transversely distributed air inlets.

In a class of this embodiment, a second wind screen is disposed on a second end of the baffle plate and attached to the first side plate; and one of the plurality of through-apertures of the baffle plate is disposed between the second wind screen and one battery module facing the second wind screen.

The following advantages are associated with the air-cooled energy storage module of the disclosure compared with the related art: the heat dissipation of the air-cooled energy storage module of the disclosure is even; the heat conduction paths are connected to each other, thus improving the performance and the cycle life of the energy storage module.

Figure 1:
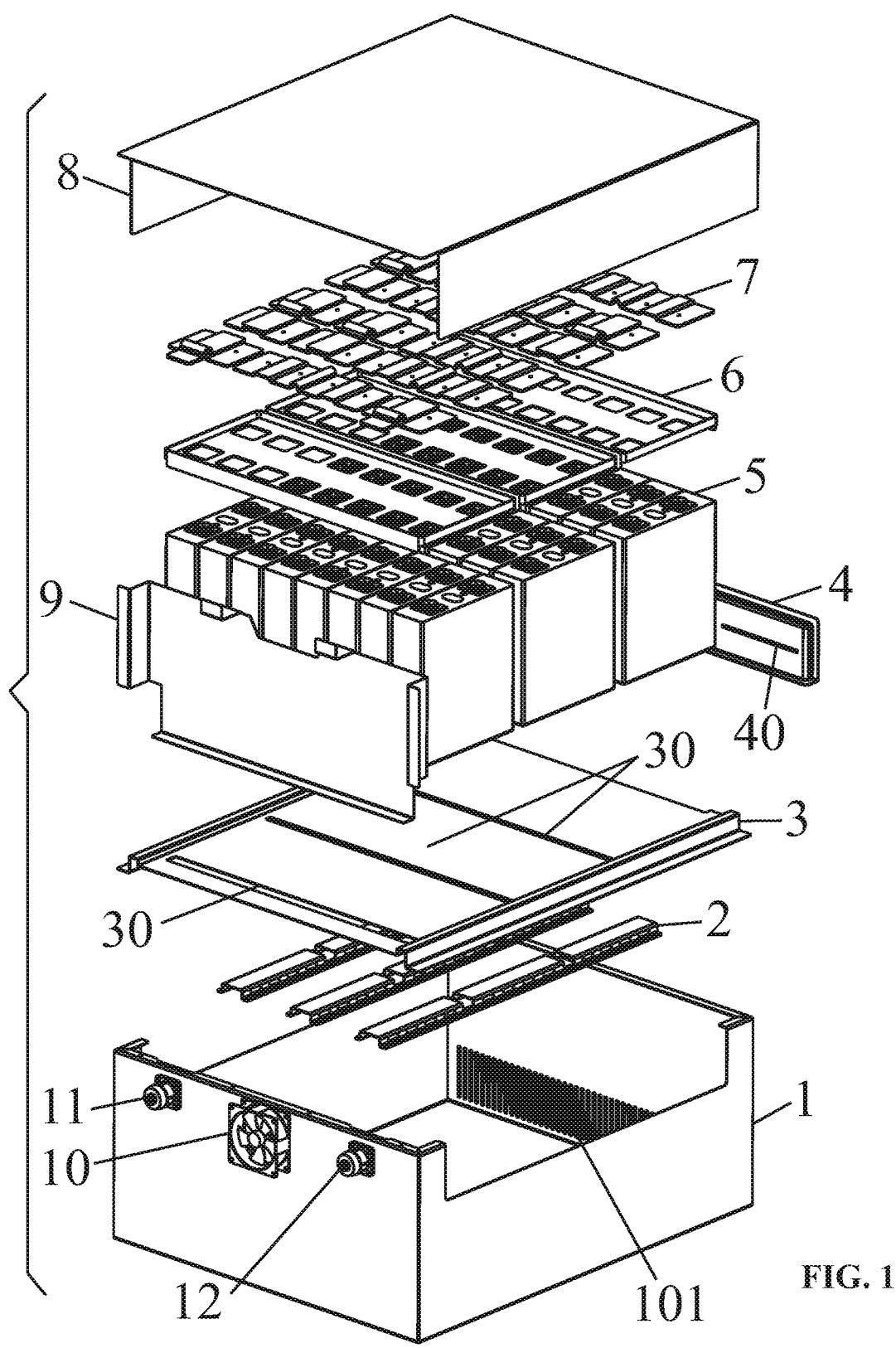
FIG. 1 is an exploded view of an air-cooled energy storage module in accordance with one embodiment of the disclosure.

In the drawings, the following reference numbers are used: 1. Box body; 2. Support beam; 3. Baffle plate; 4. First wind screen; 5. Battery module; 6. Upper support; 7. Connecting row; 8. End cover; 9. Second wind screen; 10. Axial fan; 11. Positive connector; 12. Negative connector; 30. Through-aperture; 40. Transverse groove.

DETAILED DESCRIPTION

To further illustrate, embodiments detailing an air-cooled energy storage module are described below. It should be noted that the following embodiments are intended to describe and not to limit the disclosure.

Example 1

Figure 2:
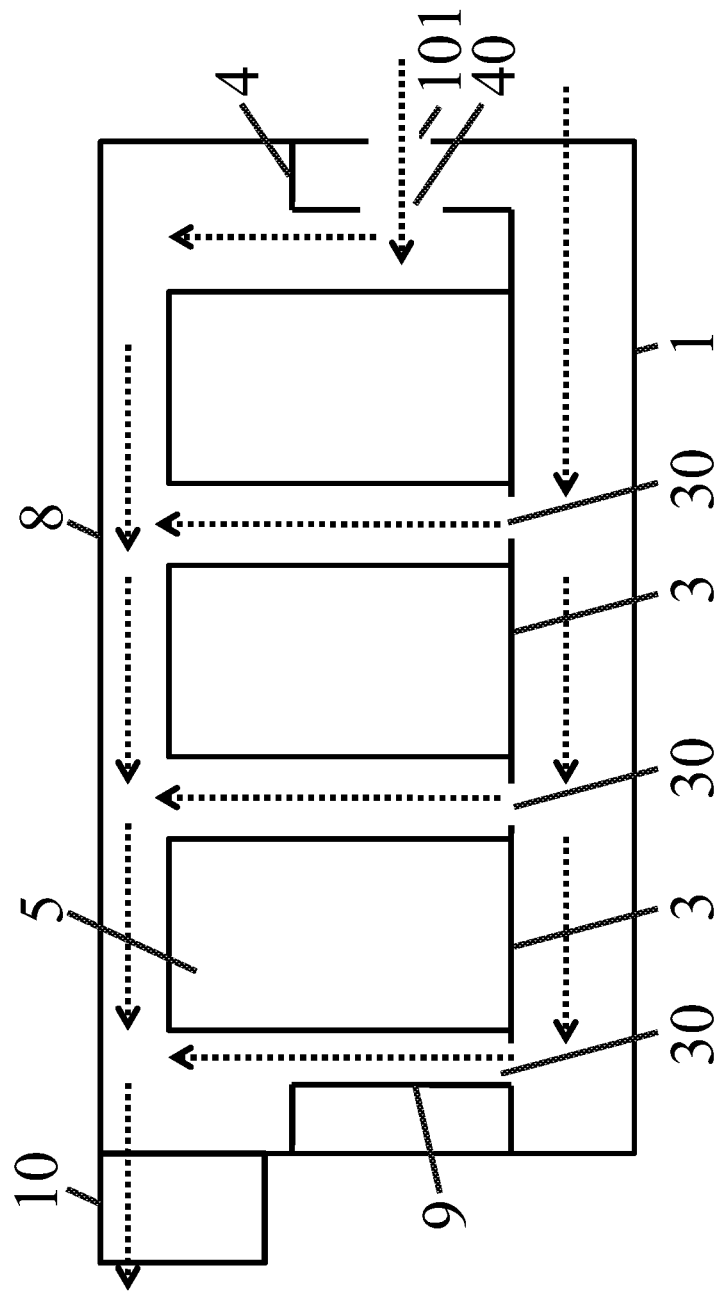
FIG. 2 shows an airflow direction in an air-cooled energy storage module in accordance with one embodiment of the disclosure.

As shown in FIGS. 1-2, provided is an air-cooled energy storage module, comprising: a box body 1, a plurality of support beams 2, a baffle plate 3, a plurality of battery modules 5, an axial fan 10, and an end cover 8. The box body is a hollow structure comprising a first side plate, a second side plate, a bottom plate, and an opening formed by the first side plate, the second side plate, and the bottom plate. The axial fan 10 is disposed on the first side plate.

The plurality of support beams 2 is disposed apart on the bottom plate longitudinally; the longitudinal direction refers to a direction along a connection line of the first side plate and the second side plate. The baffle plate 3 is disposed on the plurality of support beams 2; a first space is disposed between the baffle plate 3 and the bottom plate of the box body 1 for air circulation; the plurality of battery modules 5 (not limited to three as shown in FIG. 1) is equidistantly disposed on the baffle plate 3 longitudinally; the baffle plate 3 comprises a plurality of through-apertures 30, and each through-aperture is disposed between every two adjacent battery modules 5; the second side plate comprises a plurality of transversely distributed air inlets 101. The end cover 8 is disposed on the plurality of battery modules 5. Thus, the box body 1 and the end cover 8 form a relatively sealed box (except the air inlet and the air outlet, other positions of the box are sealed).

Specifically, two gaps are disposed between two sides of the plurality of battery modules 5 and the first side plate and the second side plate of the box body 1, respectively. The two gaps facilitate the air circulation and improve the heat dissipation effect.

Specifically, a first wind screen 4 is disposed on a first end of the baffle plate 3 and attached to the second side plate; a second space is disposed between the second side plate and the first wind screen 4 for air circulation; and the second space communicates with the first space; the first wind screen 4 comprises a transverse groove 40 facing the plurality of transversely distributed air inlets 101.

Specifically, the transverse groove 40 is aligned with a transverse central line of the plurality of transversely distributed air inlets 101.

Specifically, a second wind screen 9 is disposed on a second end of the baffle plate 3 and attached to the first side plate; and one of the plurality of through apertures 30 of the baffle plate 3 is disposed between the second wind screen 9 and one battery module 5 facing the second wind screen 9.

Specifically, an upper support 6 is disposed on the plurality of battery modules 5. The upper support comprises a plurality of holes for accommodating a plurality of connecting rows 7, respectively.

Specifically, the first side plate comprises a positive connector 11 and a negative connector disposed on two sides of the axial fan 10, respectively.

The air-cooled energy storage module based on square iron lithium battery of the disclosure comprises a metal box for carrying the battery modules. A plurality of battery modules connected in series is disposed in the metal box. The battery modules each comprise a plurality of battery cells. The top of the battery modules is provided with an upper support for supporting the battery cells. The battery cells are connected to each other via aluminum bars, and the battery modules are connected to each other via copper bars.

The metal box comprises an air-cooling channel for cooling the battery modules inside the metal box. When the axial fan on the first side plate works, cold air will enter into the box along the channel to cool the battery modules.

FIG. 1 is an exploded view of the air-cooled energy storage module of the disclosure; and FIG. 2 shows an airflow direction in the air-cooled energy storage module. The baffle plate 3 is disposed in the box body 1. The baffle plate 3 is integrated with the box body 1 by welding. The baffle plate 3 is supported by a plurality of support beams 2, and thus the first space is formed between the baffle plate 3 and the bottom plate of the box body 1 for air circulation. In this way, the cold air can enter and flow in the first space. A plurality of battery modules connected in series is disposed on the baffle plate 3. The battery modules are disposed apart from each other along the length direction (longitudinal direction) of the box body; the baffle plate 3 comprises a plurality of through-apertures 30, and each through-aperture is disposed between every two adjacent battery modules 5. Each through-aperture is designed in the shape of a grid according to air volume and wind pressure.

The first wind screen 4 is disposed on a first end of the baffle plate 3 and attached to the second side plate of the box body 1; the second space is disposed between the second side plate and the first wind screen 4 for air circulation; and the second space communicates with the first space. In addition, the first wind screen 4 comprises the transverse groove 40 for the distribution of cold air.

Specifically, when the axial fan 10 on the first side plate of the box body 1 works, the cold air first enters the second space between the second side plate and the first wind screen via the air inlet 101 on the lower part of the box body 1.

With the flow of the cold air, part of the air enters into the center of the box body through the transverse groove 40 of the first wind screen 4 to cool the battery module close to the transverse groove, and another part of the air enters the first space of the box body (i.e. the bottom space of the box body), and enter the center of the box body through the plurality of through-apertures 30 to cool the battery modules 5 in the center of the box body. The second wind screen 9 is disposed on the second end of the baffle plate 3 and attached to the first side plate. There is a through-aperture between the second wind screen 9 and one battery module 5. The cold air in the first space flows through the through-aperture to cool the battery module 5 facing the second wind screen 9.

In summary, the heat dissipation of the air-cooled energy storage module of the disclosure is even; the heat conduction paths are connected to each other, thus improving the performance and the cycle life of the energy storage module.

It will be obvious to those skilled in the art that changes and modifications may be made, and therefore, the aim in the appended claims is to cover all such changes and modifications.

What is claimed is:

1. A device, comprising:
   a box body, the box body being a hollow structure comprising a first side plate, a second side plate, a bottom plate, and an opening formed by the first side plate, the second side plate, and the bottom plate;
   a plurality of support beams;
   a baffle plate;
   a plurality of battery modules;
   a first screen plate comprising a horizontal plate and a vertical plate;
   an axial fan disposed on the first side plate; and
   an end cover;
   wherein:
   the plurality of support beams is disposed apart on the bottom plate longitudinally; a longitudinal direction refers to a direction along a connection line of the first side plate and the second side plate;
   the baffle plate is disposed on the plurality of support beams;
   a first space is disposed between the baffle plate and the bottom plate of the box body for air circulation;
   the plurality of battery modules is equidistantly disposed on the baffle plate longitudinally;
   the baffle plate comprises a plurality of through-apertures, and each of the plurality of through-apertures is disposed between two adjacent battery modules;
   the second side plate comprises a plurality of transversely distributed air inlets;
   the end cover is disposed on the plurality of battery modules;
   a first end of the baffle plate is disposed at a distance from the second side plate;
   a bottom end of the vertical plate is disposed on the first end of the baffle plate and is parallel to the second side plate;
   the horizontal plate is connected to a top end of the vertical plate and the second side plate and is parallel to the baffle plate;
   a second space is formed between the second side plate and the first wind screen for air circulation, and a bottom of the second space is open and communicates with the first space;
   the first wind screen comprises a transverse groove facing the plurality of transversely distributed air inlet; and
   when in use, air from outside of the box body enters the second space through the plurality of transversely distributed air inlets, and a first portion of the air passes through the transverse groove and a second portion of the air flows into the first space.

2. The device of claim 1, wherein two gaps are disposed between two sides of the plurality of battery modules and the first side plate and the second side plate, respectively.

3. The device of claim 1, wherein the transverse groove is aligned with a transverse central line of the plurality of transversely distributed air inlet.

4. The device of claim 1, wherein a second wind screen is disposed on a second end of the baffle plate and attached to the first side plate; and one of the plurality of through-apertures of the baffle plate is disposed between the second wind screen and one battery module facing the second wind screen.

5. The device of claim 2, wherein a second wind screen is disposed on a second end of the baffle plate and attached to the first side plate; and one of the plurality of through-apertures of the baffle plate is disposed between the second wind screen and one battery module facing the second wind screen.

6. The device of claim 1, wherein a second wind screen is disposed on a second end of the baffle plate and attached to the first side plate; and one of the plurality of through-apertures of the baffle plate is disposed between the second wind screen and one battery module facing the second wind screen.

7. The device of claim 3, wherein a second wind screen is disposed on a second end of the baffle plate and attached to the first side plate; and one of the plurality of through-apertures of the baffle plate is disposed between the second wind screen and one battery module facing the second wind screen.

\* \* \* \* \*